INVENTORS
Forrest R. Cheek &
BY Robert W. Stapleton
Robert L. Spencer
ATTORNEY

United States Patent Office 3,375,838
Patented Apr. 2, 1968

3,375,838
VACUUM MODULATOR
Forrest R. Cheek, Detroit, and Robert W. Stapleton, Ann Arbor, Mich., assignors to General Motors Corporation, Detroit, Mich., a corporation of Delaware
Filed Oct. 13, 1965, Ser. No. 495,619
9 Claims. (Cl. 137—81)

This invention relates to vacuum modulators and more particularly to an improved vacuum modulator particularly adapted for use in controlling a modulator valve of the type employed in automatic transmissions in automotive vehicles.

It is common practice to use vacuum modulators to control a so-called throttle valve in automatic transmissions in order to provide a signal hydraulic pressure which may vary with engine torque demand, vehicle speed and other factors. This variable throttle valve pressure normally increases with increase in engine torque demand and is directed to the automatic transmission shift valves tending to downshift the valves may be directed to a transmission line pressure regulator valve to increase transmission line pressure in response to increase in engine torque demand, or to control system servos, accumulators, clutches or brakes wherever torque sensitive oil pressure may be required.

The vacuum modulator employed herein employs means forming a normally closed or sealed evacuated chamber having a portion or wall thereof operatively connected to an axially movable member for biasing a modulator valve in a direction to increase the throttle valve pressure delivered by the valve. A second chamber is connected to the engine intake manifold as a source of variable vacuum and the effective vacuum is this second chamber opposes movement of the valve by the effective vacuum in the first chamber. It will be apparent that the vacuum in the first chamber comprises a fixed reference pressure which is necessary for proper calibration and operation of the modulator. If for any reason the vacuum in the first chamber is lost or diminished, the modulator will either become inoperative or will lose its calibration. The present invention provides automatically operable means for maintaining the reference pressure or vacuum in the first chamber at the desired amount or value as hereafter explained.

An object of this invention is to provide an improved modulator constructed and arranged to automatically maintain its initial calibration.

Another object of this invention is to provide an improved modulator incorporating a normally sealed chamber containing a fixed reference pressure therein and to provide means for automatically recharging the chamber with said fixed reference pressure in the event of loss or diminution of the reference pressure in the normally sealed chamber.

A further object of this invention is to provide a vacuum modulator for controlling axial motion of an axially movable force transfer member incorporating actuating means for biasing the force transfer member in a first direction including means forming a first normally sealed chamber containing a reference pressure therein and including means for opposing movement of the force transfer means in the first direction wherein the last-mentioned means includes a second chamber connected to a source of variable reference pressure and to provide automatically operable means for connecting the first and second chambers in the event of diminution of reference pressure in the first chamber to automatically re-charge the first chamber with its initial reference pressure.

A more specific object of this invention is to provide a vacuum modulator for controlling a valve wherein an axially movable force transfer member is operatively connected to the valve and to actuating means wherein the actuating means includes means forming a first normally sealed and evacuated chamber for biasing the force transfer member in a first direction of travel and also includes a second chamber connected to a source of variable vacuum for opposing movement of the force transfer means in said first direction of travel and to provide valve means normally effective to prevent fluid flow communication between said chambers and effective upon diminution or loss of reference vacuum in the first sealed chamber to connect said chambers to recharge the first chamber with its initial reference vacuum.

A further object of this invention is to provide a modulator of the type described including a first chamber normally sealed off and containing a predetermined reference vacuum and including a second chamber connected to a vehicle engine intake manifold as a source of variable vacuum and to provide valve means normally blocking fluid flow between said chambers and effective upon increase in effective vacuum in the second chamber to a predetermined amount above the effective vacuum in the first chamber to connect said chambers to re-charge said first chamber to its initial reference vacuum and to thereafter close to block off said chambers from each other.

These and other objects and advantages of this invention will be apparent from the following description and claims, taken in conjunction with the accompanying drawings, in which:

Figure 1:
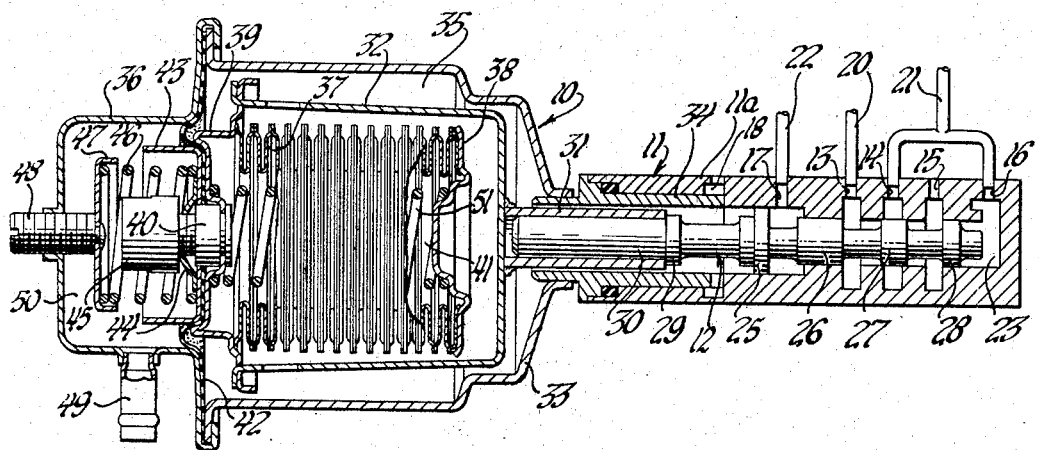
FIGURE 1 is a longitudinal sectional view through a modulator and valve body wherein the modulator is constructed in accordance with the principles of this invention.

A first embodiment of the improved vacuum modulator valve is shown in FIGURE 1. The vacuum modulator indicated generally at 10 controls a valve indicated generally at 11 having a valve body 11a and a movable valve member 12 therein. Valve body 11a is provided with six ports 13 through 18. Port 13 is a line pressure supply port adapted to receive line pressure from a passage 20. Port 14 is a throttle valve delivery port adapted to deliver variable pressure to a throttle valve delivery passage 21. Port 15 is an exhaust port. Port 16 is connected to passage 21 to admit throttle valve delivered pressure to a chamber 23. Port 17 is a governor pressure delivery port adapted to receive variable governor pressure from a governor pressure delivery passage 22. Port 18 is an exhaust valve.

Valve 12 includes five lands 25 through 29. Land 25 is of greater diameter than land 26. Lands 26 through 28 are of equal diameter. Land 29 serves as a seat for a sleeve 31 in which a stem 30 is received. Stem 30 is not required and may be omitted from the structure. Sleeve 31 is fixed to a yoke 32 and is axially movable with respect to valve body 11. Yoke 32 is an axially movable force transfer member.

A housing 33 carried by a sleeve 34 fixed in valve body 11a forms a chamber 35 subject to atmospheric pressure and supports a cover 36 thereon. An evacuated bellows 37 has one end fixed to a bellows end plate 38 which is anchored to housing 33 so as to be fixed against movement. A diaphragm connector 39 is fixed to and closes off the opposite end of bellows 37 and is fixed to an adapter 40. Yoke 32 is mechanically connected to diaphragm connector 39. It will be apparent that bellows end plate 38, bellows 37 and connector 39 and adapter 40 cooperate to form a chamber 41 within the bellows adapted to be evacuated. A calibrating spring 51 positioned within chamber 41 and seated upon fixed end plate 38 and diaphragm connector 39 tens to expand bellows 37. A diaphragm 42 is fixed between housing 33 and cover 36 and is also fixed between diaphragm connector 39 and a diaphragm piston 43. A nut 44 tightly clamps diaphragm 42 between diaphragm connector 39 and diaphragm piston 43. A spring retainer 45 is provided for retaining a ball 53 and a spring 55, best shown in FIGURE 2. A second calibrating spring 46 is positioned between diaphragm piston 43 and an adjustable spring seat 47. A screw 48 threaded in cover 36 may be turned to adjust the position of spring seat 47 relative to cover 36 to vary the effective force of spring 46 on diaphragm piston 43. A chamber 50 enclosed by cover 36 and diaphragm 42 may be connected to an engine intake manifold (not shown) by means of a nipple 49 carried by cover 36 and a conventional hose, not shown.

Figure 2:
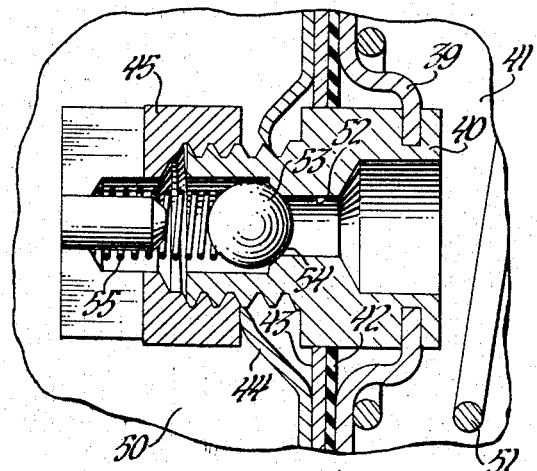
FIGURE 2 is an enlarged view illustrating the adapter and valve for permitting the reference pressure in one chamber of FIGURE 1 to be automatically re-established at its predetermined reference value.

As best shown in FIGURE 2, adapter 40, in addition to forming an air tight connection to diaphragm 42, is provided with a passage 52 extending between chamber 50 and chamber 41 within bellows 37. A ball check valve 53 is biased into contact with a valve seat 54 by means of a spring 55. Spring 55 seats on ball 53 and nut 45 and comprises a relatively low rate spring such that the spring load on ball 53 remains substantially constant irrespective of the axial position of nut 45 on adapter 40.

In operation, assuming the vehicle to be operated at a given elevation such as, for example, sea level, the evacuated bellows 37, grounded to housing 33 through bellows ends plate 38, biases diaphragm connector 39, yoke 32, sleeve 31 and valve 12 toward the right, as viewed in the drawing, or toward a position to connect line pressure supply port 13 to throttle valve pressure delivery port 14 to deliver relatively high throttle valve pressure to passage 21. Throttle valve delivered pressure in chamber 23 acting on land 28 biases valve 12 toward a position wherein port 13 is blocked off from port 14 by land 27 and port 14 is connected to exhaust port 15. An additional hydraulic pressure, which may increase with increase in vehicle speed, is delivered to port 17 through governor pressure supply passage 22. A conventional governor such as shown in the patent to Maurice S. Rosenberger 2,762,- 384 and driven by a transmission power delivery shaft may be used for this purpose. Springs 51 and 46 are calibrating springs for providing proper calibration to the assembly. Rise of governor pressure acting upon the differential area of lands 25, 26 biases the valve 12 to reduce the throttle valve pressure delivered to passage 21.

Assuming that chamber 41 within bellows 37 is evacuated, the bellows will bias force transfer member 32 and valve 12 toward its maximum throttle valve delivery positions. Engine manifold vacuum in chamber 50 acting on diaphragm 42 will oppose the action of bellows 37 and tend to move yoke 32 to the left as viewed in the drawing to permit valve 12 to move toward its minimum throttle valve pressure position. It will be apparent that with a closed engine carburetor throttle and high engine speed, high vacuum will exist in chamber 50. Diaphragm 42 will overcome the force effect of bellows 37 to position valve 12 to deliver minimum throttle valve pressure to throttle valve delivery passage 21. On the other hand, if the carburetor throttle is opened, relatively low vacuum will be present in chamber 50. The force effect of bellows 37 will be high and high throttle valve pressure will exist in passage 21. As the vehicle speed increases, governor pressure in passage 22 will increase to bias valve 12 to decrease the throttle valve pressure.

As is well known, the available engine manifold vacuum decreases with increase in altitude. Also atmospheric pressure decreases with increase in altitude. Bellows 37 expands with drop of atmospheric pressure in chamber 35 due to increase in altitude to compensate for loss of available vacuum effective in chamber 50 such that the pressure range of throttle valve pressure delivered to passage 21 will maintain proper transmission shift points and provide smooth shift of transmission drive ratio irrespective of the loss of engine power at relatively high altitudes.

Ball check valve 53 is normally seated on seat 54 to close off passage 52. Chamber 41 in bellows 48 in its normal condition is evacuated such that ball 53 is normally held against seat 54 by pressure in chamber 50. Spring 55 normally holds ball 53 against seat 54. In the event that the vacuum in chamber 50 becomes greater, by a predetermined amount than the vacuum available in chamber 41, it will overcome the force of spring 55 holding ball 53 seated and will unseat the ball 53 to connect chamber 41 to chamber 50 through passage 52. This will result in establishing or reestablishing a vacuum in chamber 41 at a desired value. With this arrangement for providing automatic means for maintaining a desired predetermined reference pressure in chamber 41, proper calibration of the valve action can be maintained throughout the useful life of the assembly. It is common in conventional structures wherein sealed bellows are employed for air to leak into the bellows, thus requiring replacement of the bellows to obtain proper regulation of the throttle valve. By automatically re-charging the bellows to the proper vacuum level, improved calibration of the action of the throttle valve and longer useful life is obtained. It will be understood that when the differential of vacuum in chamber 50 and 41 exceeds a predetermined amount, valve 53 will momentarily open and upon the differential becoming less than such predetermined amount, valve 53 will close. In this manner a predetermined reference level of vacuum is maintained in chamber 41 within bellows 37 to maintain proper calibration of the valve action throughout the useful life of the device.

Figure 3:
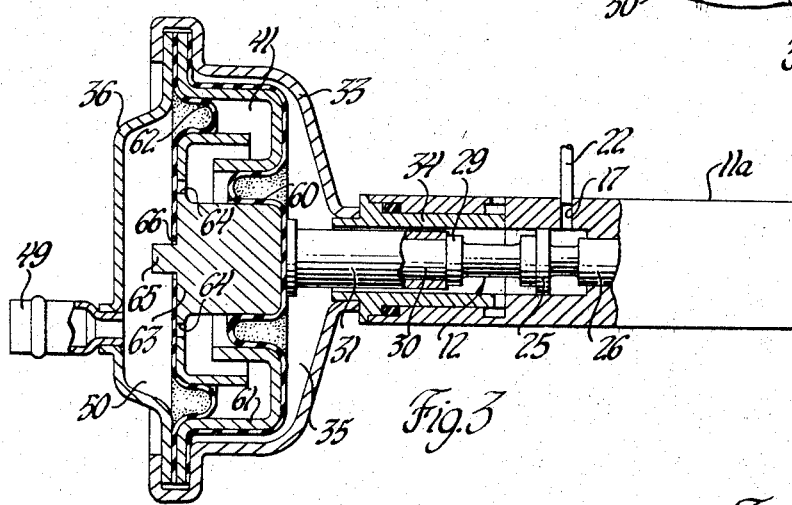
FIGURE 3 is a longitudinal sectional view through a modified modulator for actuating the valve shown in FIGURE 1.

In FIGURE 3 there is shown a modified assembly for actuating a valve similar to valve 12 of FIGURE 1. Similar numerals are used in FIGURE 2 on the parts common to FIGURE 1. Valve housing 11A slidably receives valve 12. In FIGURE 3 only lands 25, 26 and 29 and port 17 are shown. Governor pressure may be admitted to port 17 from passage 22 the same as in FIGURE 1. The valve structure and porting (not shown) is the same as shown in FIGURE 1. Housing 33 is mounted on sleeve 34 in the same manner as shown in FIGURE 1. A diaphragm piston 61 extends between first and second diaphragms 60 and 62. The housing 33 is crimped over the outer peripheral edge of diaphragm piston 61, diaphragms 60 and 62 and cover 36 to retain the parts in assembled relationship and to form an air tight connection between these parts. An adapter 63 is positioned between diaphragm 60 and diaphragm 62. Passages 64 extend through adapter 63. Diaphragm 62 extends adjacent one side of adapter 63 but is not secured to the adapter. A stop nipple 65 on adapter 63 extends axially through a central opening 66 in diaphragm 62 and may, at times, contact cover 36 to limit the range of motion of valve 12.

As in the disclosure of FIGURE 1, the assembly forms three chambers 35, 41 and 50. As in FIGURE 1, chamber 35 is connected to atmosphere, chamber 50 is connected to engine manifold vacuum through nipple 49 and conventional hose (not shown) and chamber 41 is evacuated and is adapted to intermittently be connected to chamber 50. Diaphragm 62 functions as a valve which is normally closed to block off ports 64 to prevent communication between chambers 41 and 50. In the event that vacuum in chamber 50 is greater than that in chamber 41 by a predetermined amount, diaphragm 62 will move relative to adapter 63 to establish a connection between chambers 50 and 41 through central opening 66 in diaphragm 62, through the space between diaphragm 62 and adapter 63 and ports 64 in adapter 63. In the event that the vacuum differential between chambers 50 and 41 is less than a predetermined amount, diaphragm 62 will contact adapter 63 to block off ports 64. This is the normal condition of the diaphragm.

It will be apparent that a normal amount of vacuum will be maintained in chamber 41 and that vacuum in chamber 50 will vary as heretofore described. Vacuum in chamber 41 acts upon diaphragm 62 tending to bias valve 12 toward the right as viewed in the drawing to deliver maximum throttle valve pressure. Vacuum in chamber 50, throttle valve delivered pressure and governor pressure bias the valve in opposition to vacuum in chamber 41 to reduce the throttle valve pressure delivered by the valve. Chamber 41 is intermittently charged with vacuum to maintain a predetermined reference vacuum in chamber 41 to maintain proper calibration of the valve action throughout the useful life of the assembly.

The structures herein described are designed to provide proper valve function so long as a predetermined reference pressure (vacuum) is maintained in chamber 41. The valving and porting is arranged to automatically open to momentarily open to permit the reference vacuum in chamber 41 to be re-established in the event of loss of vacuum and to thereafter close to normally seal off chamber 41 from chamber 50. In this manner, proper calibration of the valve action will be maintained irrespective of slight leakage of air into chamber 41, with consequent increase in useful life and better maintenance of initial calibration of the valve action throughout the useful life of the assembly.

We claim:

1. A vacuum modulator comprising a movable member, means forming an evacuated chamber, said means having a first portion fixed against movement and a second movable portion operably connected to said movable member, means forming a second chamber adapted to be connected to a source of variable vacuum, passage means between said chambers, means normally effective to block off said passage to block communication between said chambers, said blocking means being movable upon establishment of a predetermined pressure differential between said chambers to permit communication between said chambers through said passage means.

2. A vacuum modulator comprising a movable member, means forming a first evacuated chamber, said means having one portion fixed against movement and a second portion connected to said movable member whereby said movable member is biased for movement in a first direction by vacuum in said first evacuated chamber, means forming a second chamber adapted to be connected to a variable source of vacuum, the vacuum in said second chamber opposing movement of said movable member in said first direction, passage means between said chambers, and means normally blocking off said passage means for preventing communication between said chambers, said last-mentioned means being movable relative to said passage means to permit communication between said chambers when the vacuum differential between said chambers exceeds a predetermined amount.

3. A vacuum modulator comprising means forming a first chamber adapted to be evacuated including spaced walls, a movable member operably connected to one of said walls, said one wall being biased for movement in one direction by vacuum in said first chamber, means forming a second chamber adjacent said one wall of said first chamber adapted to be connected to a source of variable vacuum, the vacuum in said second chamber acting on said one wall to oppose the force effect of vacuum in said first chamber on said one wall, a passage between said chambers, means normally blocking off said passage to prevent communication between said chambers, said last-mentioned means being movable with respect to said passage upon establishment of a differential vacuum in said chambers of a predetermined amount to connect said chambers to each other through said passage, said blocking means being movable relative to said passage to block off said passage when the differential vacuum between said chambers falls below said predetermined amount.

4. A vacuum modulator comprising means forming a first chamber adapted to be evacuated including first and second walls, a movable member movable in response to movement of said second wall, said second wall being movable towards said first wall in response to vacuum in said first chamber, means forming a second chamber on the side of said second wall opposite said first chamber, means connecting said second chamber to a source of variable vacuum, the vacuum in said second chamber opposing movement of said second wall toward said first wall, passage means between said first and second chambers, valve means normally blocking said passage means to prevent passage of fluid from said second chamber to said first chamber through said passage, said valve means being movable to open said passage and responsive to vacuum differential between said chambers for establishing a fluid flow connection between said chambers upon loss of vacuum in said first chamber to re-establish the vacuum in said first chamber.

5. A vacuum modulator comprising a bellows forming an evacuated chamber, means for preventing axial motion of one portion of said bellows, means operatively connecting a second portion of said bellows to an axially movable member whereby said bellows biases said movable member for axial motion in one direction, means including a diaphragm forming a second chamber, means connecting said second chamber to a source of variable vacuum, an adapter movable as a unit with said movable member, the vacuum in said second chamber opposing movement of said axially movable member in said one direction, a passage through said adapter, and means normally blocking off said passage, said last mentioned means being movable upon loss of vacuum in said first chamber to open said passage to re-establish the vacuum in said first chamber, said last-mentioned means being automatically movable to block off said passage upon re-establishment of a predetermined degree of vacuum in said first chamber.

6. A vacuum modulator for controlling a valve comprising an axially movable force transfer member operatively connected to said valve, means for biasing said force transfer member for movement in a first direction including an evacuated unit have a movable member operable in response to vacuum within said unit to bias said force transfer member in said first direction, means forming a chamber connected to a source of variable vacuum, the vacuum in said last-mentioned chamber opposing movement of said force transfer member in said first direction, a passage for connecting said evacuated unit to sid chambr, means normally blocking said passage, said last-mentioned means being movable upon loss of vacuum in said evacuated unit to open said passage to thereby re-establish the vacuum in said unit, said last-mentioned means being effective to re-block said passage upon re-establishment of vacuum in said unit to seal off said unit from said chamber subjected to variable vacuum.

7. A vacuum modulator for controlling a valve including means operably connected to said valve and forming a first chamber normally evacuated such that said connecting means applies a thrust to said valve tending to bias said valve in a first direction, means forming a second chamber, said second chamber being connected to a source of variable vacuum, the vacuum in said second chamber being effective upon said connecting means to oppose the force effect of vacuum in said first chamber on said connecting means, a passage between said chambers, means normally blocking said passage to prevent communication between said chambers, said blocking means being effective to open said passage means to permit communication between said chambers whenever the vacuum present in said second chamber exceeds the vacuum present in said first chamber by a predetermined amount.

8. A vacuum modulator for controlling a valve comprising a movable valve member, means forming a first chamber adapted to be evacuated including spaced first and second walls, said second wall being movable toward said first wall in response to vacuum in said first chamber, means movable in response to movement of said second wall for moving said valve member, means forming a second chamber adapted to be evacuated and disposed on the side of said second wall opposite said first wall, means connecting said second chamber to a source of variable vacuum, passage means for connecting said chambers to each other, means normally blocking off said passage means to prevent communication between said chambers, said blocking means being movable relative to said passage means in response to a predetermined vacuum differential in said second and first chambers to permit said passage means to connect said chambers to each other.

9. A vacuum for controlling a valve comprising a movable valve member, means forming a first evacuated chamber including first and second spaced diaphragms, an adapter operatively connected to said valve member, means forming with said second diaphragm a second chamber connected to a source of variable vacuum, the vacuum in said second chamber opposing the effect of vacuum in said first evacuated chamber, a passage through said adapter for establishing communication between said chambers, said second diaphragm being normally effective to block off said passage and effective to move relative to said passage to open said passage in response to the establishment of a vacuum differential between said first and second chambers of a predetermined amount.

References Cited

UNITED STATES PATENTS

| | | | |
|---|---|---|---|
| 3,106,104 | 10/1963 | Harry | 92—36 XR |
| 3,228,197 | 1/1966 | Tipping | 60—60 |
| 3,295,388 | 1/1967 | Groves | 92—36 XR |

WILLIAM F. O'DEA, *Primary Examiner.*

R. GERARD, *Assistant Examiner.*